United States Patent [19]

Hendershot, III et al.

[11] 3,777,075

[45] Dec. 4, 1973

[54] HIGH SPEED THERMAL DUPLICATION OF MAGNETIC TAPE

[75] Inventors: William B. Hendershot, III; Michael W. Tallent, both of San Jose; David Wald, Santa Clara; Larry K. Whitlock, San Jose, all of Calif.

[73] Assignee: Consolidated Video Systems, Inc., Santa Clara, Calif.

[22] Filed: Sept. 17, 1971

[21] Appl. No.: 181,404

[52] U.S. Cl. .................................... 179/100.2 B, 179/100.2 E, 100.2 CR, 100.2 S, 226/25, 242/180, 346/74 MT

[51] Int. Cl. ............................................ G11b 5/00

[58] Field of Search ............... 179/100.2 B, 100.2 E, 179/100.2 CR, 100.2 S, 100.2 PM; 226/25, 97, 195; 242/180–185, 188–190; 346/74 MT

[56] References Cited

UNITED STATES PATENTS

| | | | |
|---|---|---|---|
| 3,633,807 | 1/1972 | Williams | 226/97 |
| 3,037,090 | 5/1962 | Bouzemburg | 179/100.2 E |
| 3,161,120 | 12/1964 | Timares et al. | 179/100.2 E |
| 3,364,496 | 1/1968 | Greiner et al. | 179/100.2 E |
| 3,441,342 | 4/1969 | Ball et al. | 179/100.2 S |
| 3,465,105 | 9/1969 | Kumada et al. | 179/100.2 E |
| 3,472,971 | 10/1969 | Van Den Berg | 179/100.2 E |
| 3,485,961 | 12/1969 | Lovick et al. | 179/100.2 E |

*Primary Examiner*—Terrell W. Fears
*Attorney*—Townsend & Townsend

[57] ABSTRACT

A system for high speed thermal duplication of a master magnetic tape onto a slave magnetic tape utilizing a master tape transport for guiding a master tape along a predetermined path between a supply station and a take-up station, and a slave tape transport for guiding a slave tape along a second predetermined path between a supply station and a take-up station, the master tape path and slave tape path being coincident over a predetermined length. A transfer station interposed in the paths of the master tape and slave tape transports includes an arrangement for clamping together under pressure the master tape and slave tape along the predetermined distance of path coincidence. A tape heater upstream from the pressure clamp heats the slave tape to a predetermined temperature prior to pressure contact against the master tape. The system provides arrangements for mechanical isolation of tape segments in the transfer area, tension control and equalization for the master and slave tapes, preconditioning of the slave tape and a variety of heaters. A system for AC assisted thermal duplication is also described.

49 Claims, 24 Drawing Figures

INVENTORS
WILLIAM B. HENDERSHOT III
MICHAEL W. TALLENT
DAVID WALD
LARRY K. WHITLOCK

Townsend and Townsend
ATTORNEYS

INVENTORS
WILLIAM B. HENDERSHOT III
MICHAEL W. TALLENT
DAVID WALD
LARRY K. WHITLOCK

Townsend and Townsend
ATTORNEYS

HIGH SPEED THERMAL DUPLICATION OF MAGNETIC TAPE

This invention relates to a new and improved system and method for thermomagnetic recording and in particular for high speed thermal duplication of magnetic video tapes.

Certain methods and apparatuses for thermomagnetic recording have been described in British Patent specification No. 1,139,232. According to the general characterization of the thermomagnetic recording and amplifying process set forth in the British Patent, a magnetic signal or record member to be reproduced and amplified is placed in intimate contact with a copying member having a support containing the material magnetizable to a hard magnetic state. The magnetic signal or record member and copying member are subjected to energy whereby the temperature of the copying member is raised to a temperature at least in the vicinity of the Curie temperature of its magnetizable material, while the original magnetic signal or member is in contact with the copying member. While still in contact, the copying member is cooled from the vicinity of the Curie temperature of its magnetizable material. The result is an amplified record of the original magnetic signal on the copying member. As further summarized in the British Patent:

> "In the thermomagnetic amplification process there are three basic requirements: (1) a magnetic signal or image to be copy/amplified; (2) a copying member in which the amplified signal is to be formed comprising a material magnetizable to a hard magnetic state; and (3) exposing means selected from the group just discussed for affecting the rise in temperature of the magnetizable component of (2) substantially near to, at, or above the Curie temperature thereof and subsequently cycling (1) and (2) back down through the Curie temperature of the magnetic component of (2), all of step (3) being effected with intimate contact being maintained between (1) and (2) until below the Curie temperature of (2)."

In effecting the system and method as characterized above two basic types of equipment are used. The first relates to a rotating magnetic recording head for generating a signal to be thermally duplicated on a magnetic tape or belt, passing around a portion of the circular magnetic recording head as it rotates. This type of equipment functions directly to thermomagnetically record a signal from a head onto a magnetic recording medium. The second type of equipment relates to transferring a signal from a first or master recording medium to a second or slave recording medium. The type of hardware used for the second type of equipment consists in tangentially contacting drums, rolls, or cylinders, one of which carries the master record medium and the other of which carries the slave or intermediate magnetic medium which is heated prior to tangential contact with the master drum. The record medium is in the form of a drum or cylinder surface or an endless belt. Because a mirror image reversal occurs in transfer from the first tangential surface to the second, a third drum is provided in tangential contact with the second for final transfer from the intermediate record medium surface to the final slave record medium which contains the unreversed copy of the original signal.

The apparatus for thermal duplication of record media set forth in the British Patent suffers from considerable problems in heating and degradation of the master and in speed and efficiency. In order to avoid degradation of the master through heating the disclosure therefore teaches the preferred use of a master magnetic record medium having a Curie temperature higher than the Curie temperature of the magnetic record medium comprising the slave. Furthermore, the apparatus is to a great extent limited to the use of drum or cylinder interfaces and endless belts for record medium duplication and is not well suited for tape applications.

Systems adapted for tape duplication from a master tape to a copy tape or slave tape using the thermoremanent process as described in the article "Thermomagnetic Duplication of Magnetic Tape Recordings", by Dickens & Jordan, *Journal of the SMPTE*, Volume 80, pages 177 and 178, March 1971. In particular, FIG. 7 illustrates an arrangement in which the heated copy tape and the master tape are brought into contact by an air clamp consisting of porous bronze jaws through which the tapes are fed for air pressure contact. Such attempts at thermoremanent tape duplication however have suffered from the inability to control the relative tensions on the master and copy tapes and the heating of the copy or slave tape. The inability to control these parameters results in tape distortion or distortion of the duplicated signal known as geometric distortion and time base error. Thus, during the transport and handling of the master and slave tapes through the heating of the slave tape and pressure clamping of the master and slave tapes dynamic and static tensional errors in the slave tape during heating and cooling result in distortion of the recorded signal relative to the master signal.

It is therefore an object of the present invention to provide new and improved systems and methods for thermal duplication of magnetic record media with particular reference to video tapes and other magnetic tapes. Another object of the invention is to provide systems and methods for high speed thermal duplication from one magnetic tape to another using a single type of magnetic tape with the same Curie temperature. That is, the present invention is not limited to the use of magnetic record media for the master and slave tapes having different Curie temperatures, coercivities, or other characteristics.

A further object of the invention is to provide a system for thermoremanent duplication which compensates for and eliminates geometric distortion and time base error in the recorded signal by means of precise feed-back control of tension on the slave tape and/or master tape and through tensional isolation of the tape segments in the transfer area from external forces.

The present invention generally contemplates providing a master tape transport comprising a supply reel station, a take-up reel station, means for applying predetermined tension to a master tape transported between the stations, and means for guiding the master tape between the stations in a predetermined path. Similarly, a slave tape transport comprises a supply reel station, a take-up reel station, means for applying predetermined tension to a slave tape transported between the stations, and means for guiding the slave tape between the stations in a predetermined path. The master and slave tape transports are juxtaposed with a portion of the respective master and slave tape paths coinciding. The invention further comtemplates providing means interposed in the paths of the master and slave tape transports for pressure clamping the master tape and slave tape in intimate contact against each other along the predetermined coinciding length of the paths. A tape heater along the path of the slave tape upstream from the pressure clamping means heats the slave tape to a temperature in the vicinity of the Curie temperature of the magnetizable material used in the tape.

In a preferred form the invention contemplates pressure contacting the master and slave tapes in initimate contact over a specified distance by means of air pressure applied at the outsides of the tape. In one example the air pressure clamping is accomplished by a pair of opposed spaced apart sintered plates defining the coincident portion of the master and slave tape paths between which pass the tapes carried by the master and slave tape transports. High pressure air is applied to chambers at the outside of each plate subjecting the master and slave tapes to high pressure contact against each other.

A feature and advantage of this arrangement is that the master and slave tape can be maintained in intimate contact over a desired length of the respective paths after the slave tape is heated facilitating control at high speeds over thermally effected magnetic transfer to the slave tape without thermal degradation of the master tape. Another advantage of the air clamp is that only the master tape is driven by, for example, a capstan, while the slave tape is pulled along in registration with the master tape by the air clamp.

The invention also contemplates mechanically isolating segments of the magnetic and slave tapes in the transfer area of the system and precisely controlling tension on the tapes by a variety of expedients. In a preferred form, a plurality of vacuum columns is interposed in the tape transport paths of the master and slave tape transport, at least one downstream from each of the supply reel stations and at least one upstream from each of the take-up reel stations. Each of the vacuum columns consists of a chamber in which the tape is held at a predetermined depth under a constantly maintained force. Each of the vacuum columns associated with one of the supply or take-up reed stations operates in association with the reel motor to maintain constant tension on the tape segments between the vacuum columns and isolates the tape segments from undesired mechanical variations and transient forces from the reel mechanisms and reel motors.

In order to eliminate tension differentials and record signal length distortions between the master and slave tape resulting from static and dynamic tension errors as a result of heating the slave tape, the invention contemplates sensing the signal frequency on the master tape after pressure clamping and during transport and generating a first signal proportional to said frequency, sensing the signal frequency on the slave tape after pressure clamping and during transport and generating a second signal proportional to said frequency and generating the difference signal of the first and second signals to provide a feed-back control signal. The tension on the slave tape is then varied in accordance with the feed-back control signal to eliminate differential signal record lengths between the recorded signals on the master tape and slave tapes. In a preferred embodiment this is accomplished by interposing a fifth vacuum column in the tape transport path of the slave tape transport and controlling the vacuum in said fifth column in accordance with the feed-back control signal. Alternatively, the feed-back control signal can be applied to vary the vacuum in one of the other vacuum control columns which would otherwise be maintained at a constant level. Finally, the feed-back control signal can be used to control tension on the master tape.

A feature and advantage of this arrangement is that geometric distortion and time base error in the duplicated signal is eliminated. Such distortion originates with expansion or elongation of the slave tape after heating under the tension of the tape transport. The signal from the master is duplicated on the elongated slave tape which after cooling contracts, distorting the signal by increasing the frequency. The present invention alleviates this geometric or time base distortion by determining the occurrence of any distortion in the duplicated signal recorded on the slave tape. This is accomplished by sensing the frequency of the master signal, the frequency of the corresponding copied signal and generating a difference signal proportional to the difference in frequency between the master and copied signals. This differential signal provides a feedback control signal which in one example is used for regulating the tension or drag on the slave tape as it passes into and through the transfer area. Thus, the feed-back control signal controls the vacuum on a fifth vacuum column interposed in the slave tape path or is coupled to control the vacuum on one of the other vacuum columns in the slave tape path. By reducing the tension the "stretch" or elongation of the slave tape is controlled. According to an alternate embodiment, the feed-back control signal is applied to a vacuum column in the master tape path to regulate tension on the master tape as it passes into and through the tape transfer area. In this manner the master tape can be stretched or elongated in an amount to match and thus compensate for the elongation in the slave tape and consequent signal distortion as measured by the differential feed-back control signal. Finally, the feed-back control signal can be used to regulate and increase tension on the slave tape after it has passed through the tape transfer area and prior to setting to achieve the same compensation and elimination of signal distortion.

A variety of tape heaters is also contemplated by the present invention. In one form the heater consists of an elongate surface of a thermally conducting material upstream from the pressure clamping means and in the slave tape path in order to afford saturation heating of the slave tape. Embedded in the heat conducting surface is a plurality of electrical heaters. Intimate contact is afforded between the slave tape and the heat conducting surface by means of a vacuum slot at the upstream end of the surface to which low pressure is applied for eliminating the air cushion along the air surface of the tape generated at high speeds and to permit closer approach and contact of the slave tape with the heat conducting surface. The heater can be located on either side of the magnetic tape for saturation heating.

In one configuration the slave tape is oriented with the magnetic surface facing the master tape and the base facing away. The heat conducting surface is positioned to heat the magnetic side of the tape oriented toward the master tape to a temperature in the vicinity of the Curie temperature of the magnetic material. According to another embodiment, however, a tape cooler is providing on the other side of the slave tape opposed to the heater for cooling the base or substrate of the tape to minimize distortion of the tape from heating. A feature and advantage of this arrangement is that only the layer of magnetizable material is heated to the Curie temperature reducing problems of heat dissipation, degradation of the master tape by heating, and distortion of the base or substrate of the slave tape from heating.

The heating includes a thermocouple for monitoring and a thermistor or other thermal sensing element which generates a feed-back control signal. This is compared with a standard for controlling the electric power input to the electrical heating elements in the heater. A variety of other heaters including flame heaters can be used for the saturation type heaters.

The invention also contemplates flash heating the layer of magnetizable material on the slave tape to minimize heat dissipation in the base or substrate of the tape. This is accomplished by a variety of embodiments including short contact heaters and flame heaters.

One of the problems encountered in thermomagnetic tape duplication relates to the effect of heating on the tape substrate or base generally formed of a plastic material. Passage of the slave tape through the thermal stage followed by cooling results in setting certain tape characteristics so that in order to have constant tape characteristics throughout the tape transport path, and avoid signal distortion it is necessary to prerun the slave tape through the slave tape transport path with the heater and related elements operating in order to set the tape. The problem of prerunning is avoided according to the present invention by providing a tape preconditioner consisting of a tape heater followed by a tape cooler upstream from the tape transfer area and isolated by means of a vacuum column added to the slave tape transport path.

As an alternative to the use of vacuum columns for tension control and mechanical isolation of the tape segments in the tape transfer area, spring biased tension arms can also be used related through feed-back circuitry to the reel motors to provide constant tension in a manner analogous to the vacuum columns.

All of the elements of the master tape transport and slave tape transport including additional air guides which further define the master and slave tape paths are mounted on a flat plate which forms an index edge for the lower edges of a master tape and slave tape mounted for transport. The flat plate forming the index edge is formed of a metal such as aluminum anodized at its upper surface to provide a hard surface resistant to abrasion from high speed tapes whose lower surfaces are indexed against the plate.

Recently, techniques have been developed for duplicating video tapes through an AC contact duplication process. Such techniques have been described in Esterly, "Contact Duplication of Transverse Video Tape Recordings", *Journal of the SMPTE*, volume 79, pages 903–907, October 1970. According to another aspect of the present invention the AC contact duplication techniques are uniquely incorporated to provide a system for AC assisted thermal duplication of a master magnetic tape onto a slave magnetic tape. The AC assisted thermal duplication system contemplated by the invention is similar to that heretofore described in utilizing master and slave tape transports, and a transfer station interposed in the paths of the master tape and slave tape for pressure clamping the master tape and slave tape against each other over a predetermined path length and for heating the slave tape upstream from the pressure clamping means. In addition, however, a magnetic head is positioned at the pressure clamping means for applying an AC magnetic field to the clamped slave tape and master tape. The heater is adjusted to provide a coercivity ratio of the master tape to the slave tape, i.e. the coercivity of the magnetizable layer of the master tape to the coercivity of the magnetizable layer of the slave tape in the order of approximately 2.5 to 1 or greater. Because of the coercivity ratio, a small AC field generated from the magnetic head permits efficient AC duplication as is otherwise known in the non-thermal magnetic AC duplication art. In its broad aspect the invention thus contemplates a method for thermally assisted AC duplication of magnetic tapes comprising transporting a master magnetic tape carrying a signal to be reproduced along a predetermined path, transporting a slave magnetic tape on which the signal is to be duplicated along a second predetermined path, heating the slave tape to a predetermined temperature, pressure contacting the slave tape and master tape against each other after heating the slave tape and maintaining said pressure contact over a predetermined path length, and applying an AC magnetic field to the pressure contacted slave and master tapes.

A feature and advantage of the AC assisted thermal duplication or thermally assisted AC duplication is that duplication is permitted at lower temperatures minimizing base film distortion of the slave tape.

Other objects, features and advantages will become apparent in the following specification and accompanying drawings.

FIGS. 3 and 4 are fragmentary plan cross-sectional and side cross-sectional views respectively of a vacuum column, while

Figures 5, 6A, 6B:
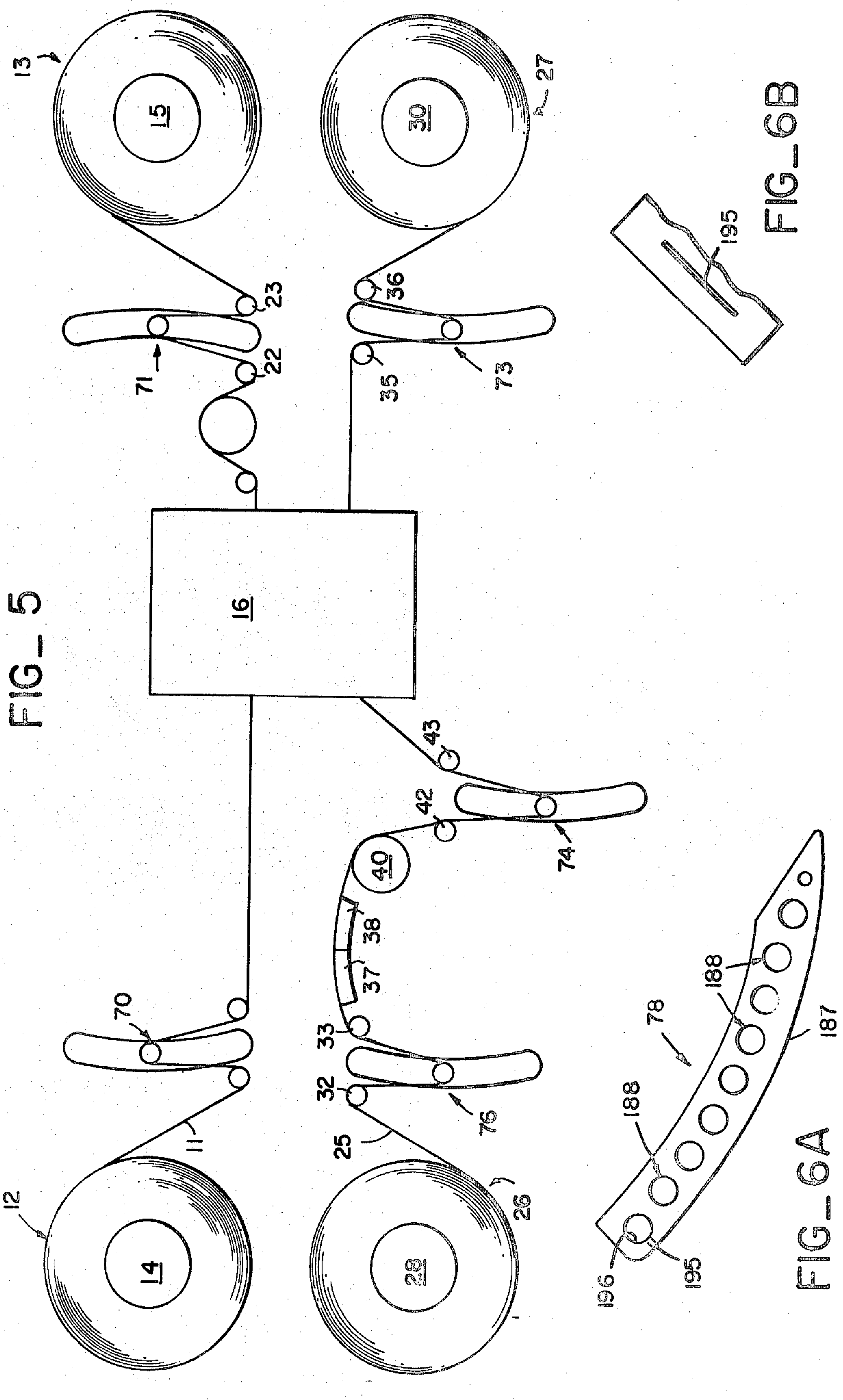
FIG. 5 is a diagrammatic plan view of another system for high speed thermal duplication of magnetic tape using spring biased tension arms for tension control rather than vacuum columns.

FIG 6*a* is a detailed cross-sectional plan view of the heater and FIG. 6*b* is a detailed view of the vacuum slot.

Figures 7A, 7B, 7C, 8, 9:
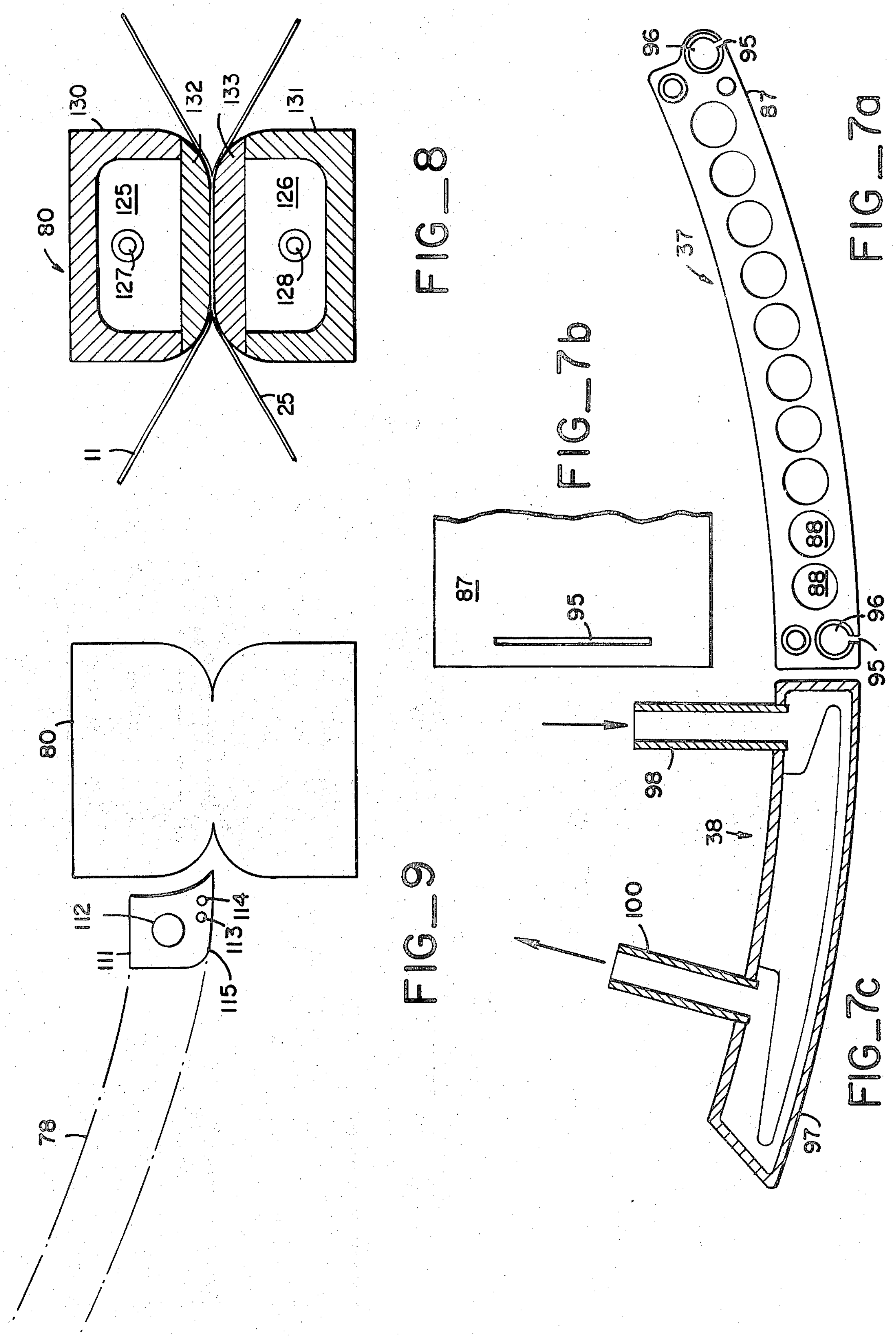

FIG. 7*a* is a detailed cross-sectional view from above of the tape contact heater for the tape pre-conditioner, while FIG. 7*b* is a detailed front view of a vacuum slot at the upstream end of the heater. FIG. 7*c* is a similar view of a tape contact cooler for the tape pre-conditioner.

FIG. 8 is a detailed cross-sectional plan view of the air clamp.

FIG. 9 is a fragmentary diagrammatic plan view showing an alternate form of contact heater upstream from the air clamp for minimizing thermal skin depth.

Figure 10:
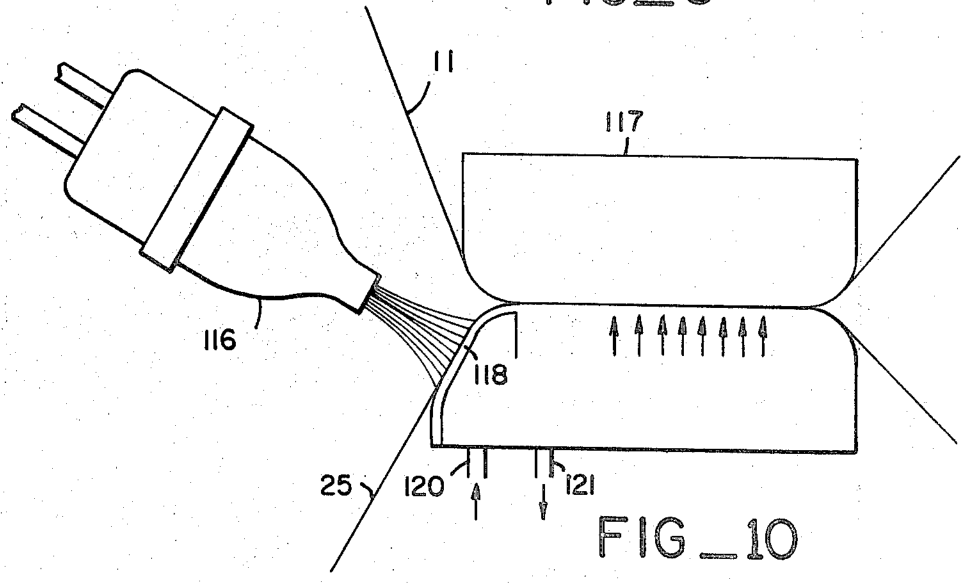

FIG. 10 is a diagrammatic plan view showing a flash heater upstream from the air clamp.

Figure 11:
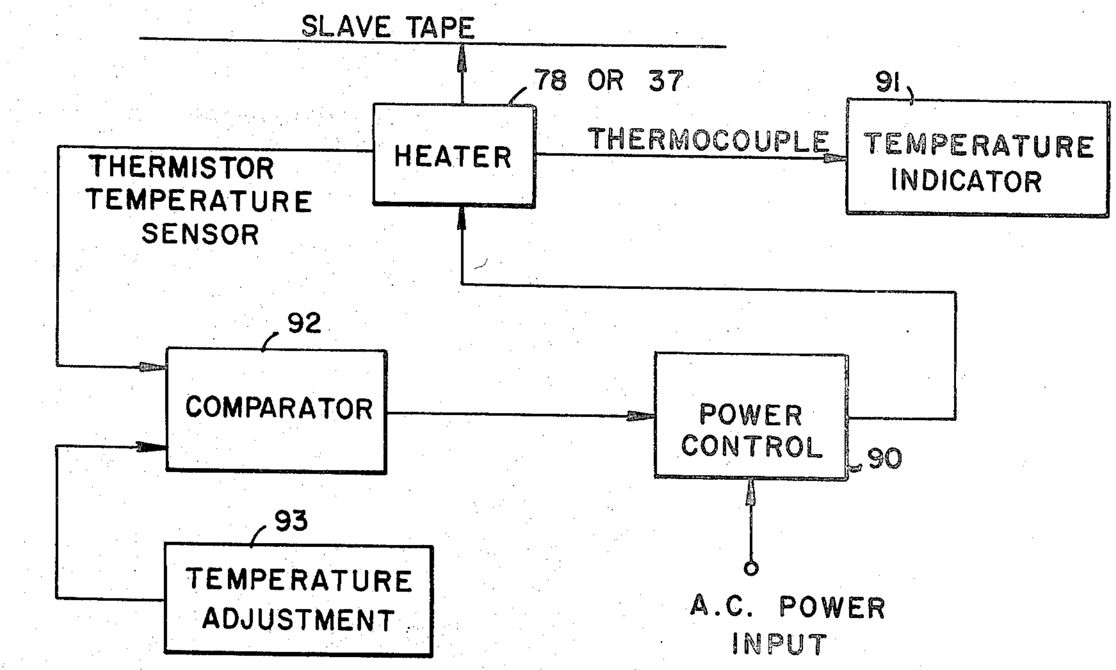

FIG. 11 is a block diagram of the heater temperature feed-back control circuit.

Figure 12:
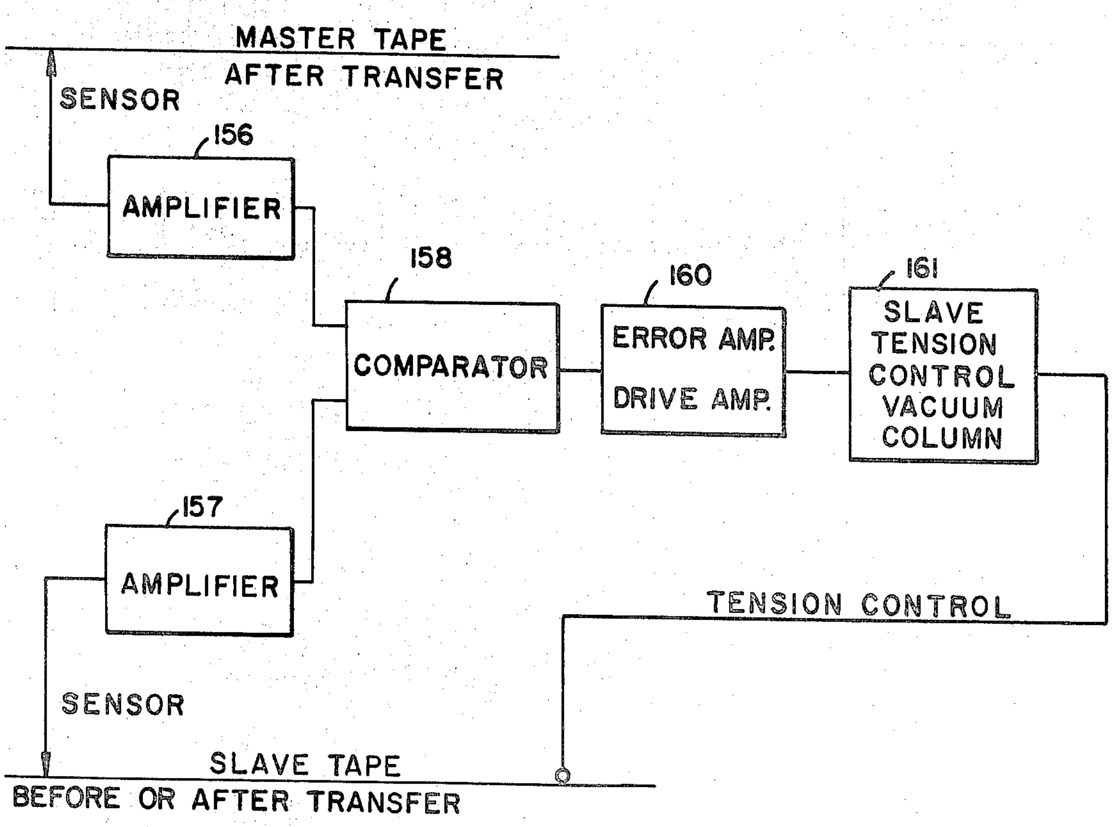

FIG. 12 is a block diagram of the feed-back control circuit for compensating for and eliminating distortion in the copy signal through tension control of the tapes.

Figure 13:
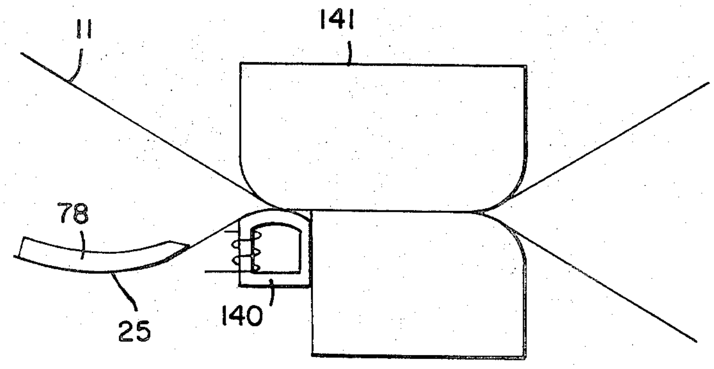

FIG. 13 is a diagrammatic plan view of a transfer area for AC assisted or anhysteretic thermal duplication of magnetic tape.

Figure 14:
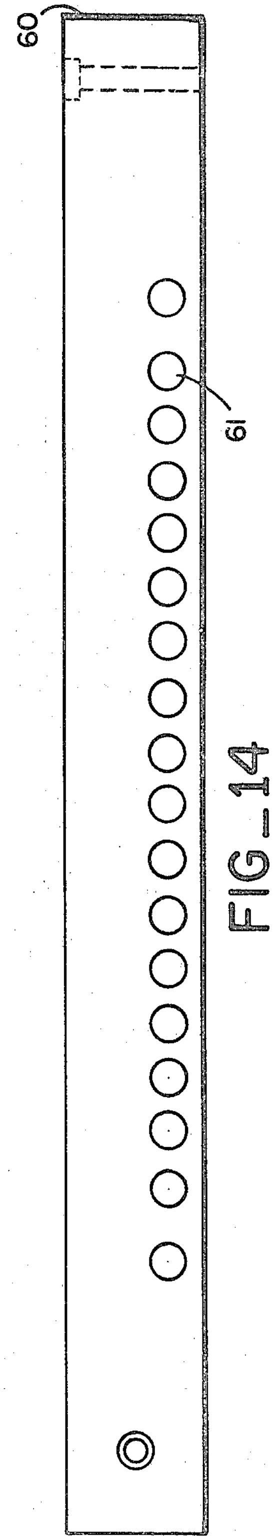

FIG. 14 is a side view of the walls of an alternate form of vacuum column for accommodating tapes of variable width.

Figure 15:
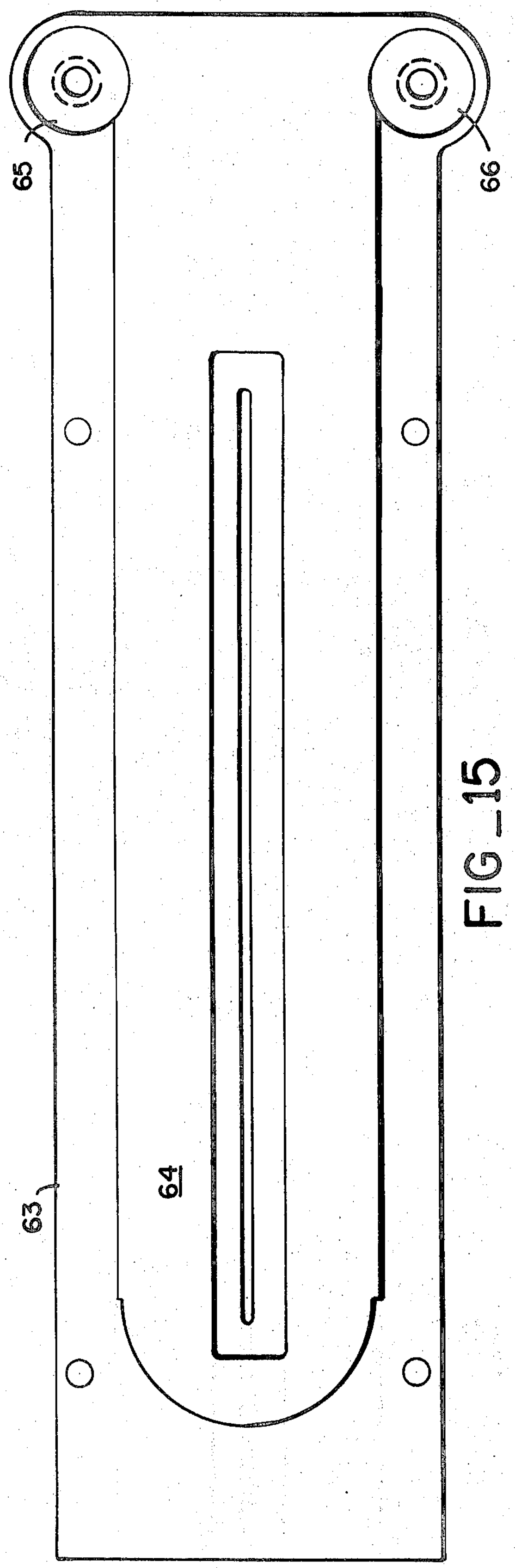
Figure 16:
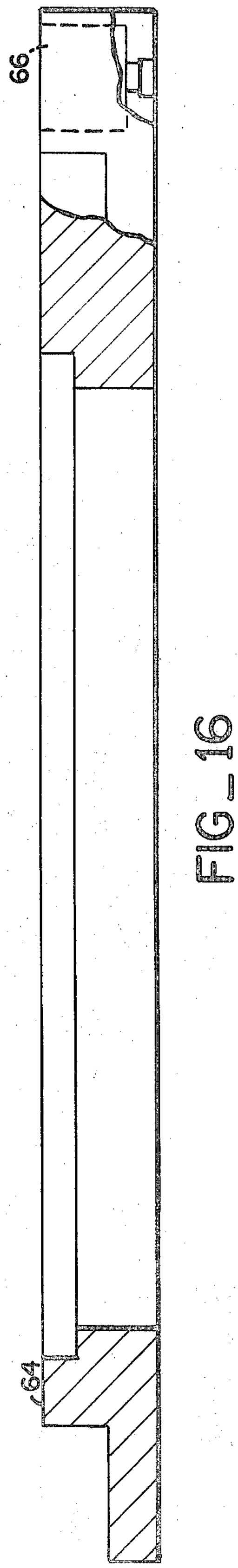

FIG. 15 and 16 are a plan view from the bottom and a side cross-sectional view respectively of the cover for the vacuum column suitable for accommodating tapes of variable width.

Figure 17:
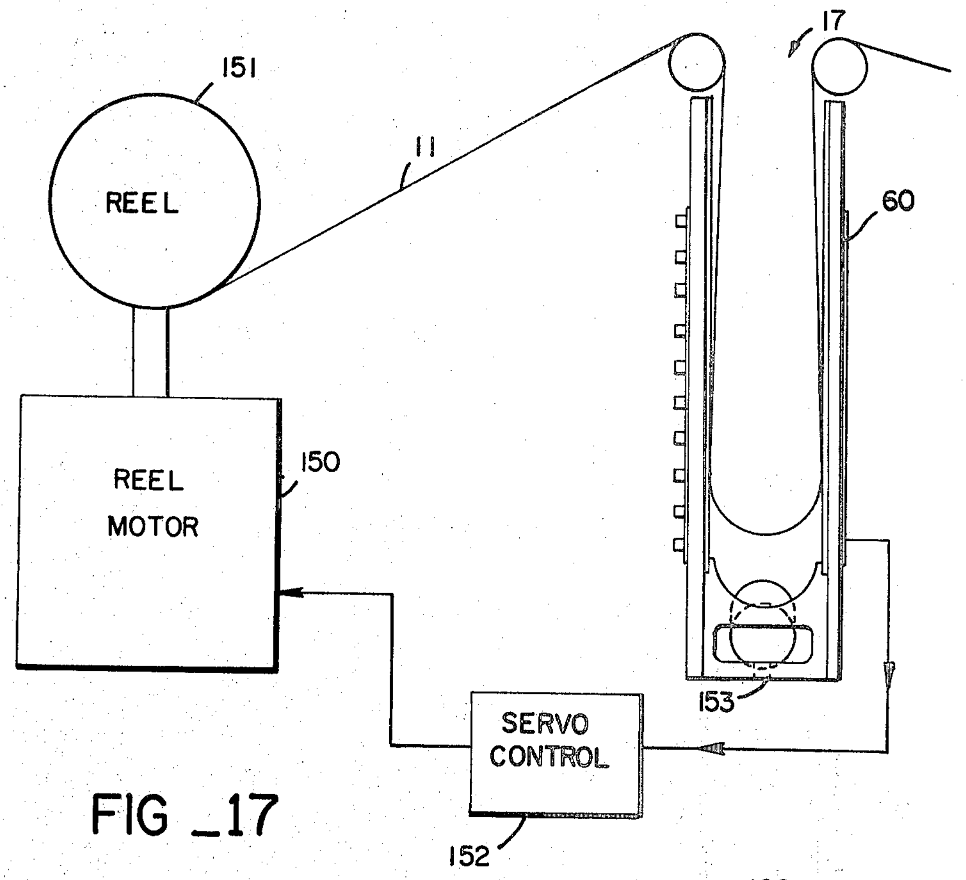

FIG. 17 is a diagrammatic view of the coupling between a vacuum column and its associated reel motor or capstan motor.

Figure 18A:
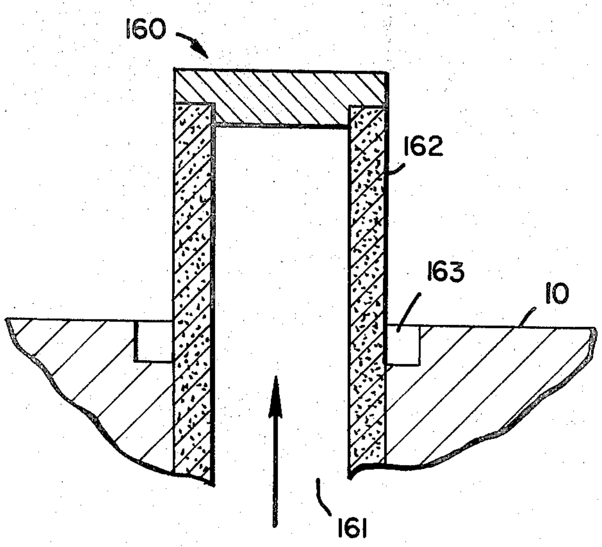
Figure 18B:
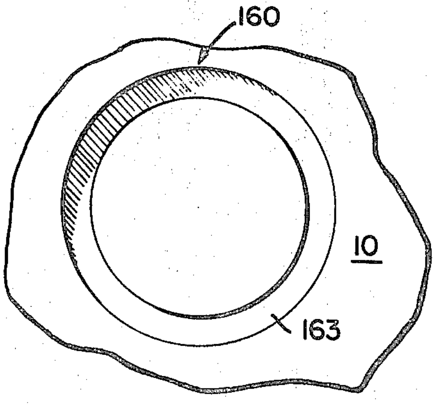

FIGS. 18*a* and 18*b* are a side cross-sectional view and plan view respectively of an air guide or air spindle design according to the present invention.

The term ∓recording " as used hereinafter in the specification and claims is defined and intended to broadly include magnetic recording and duplication from one tape or other magnetic medium to another.

Figure 1:
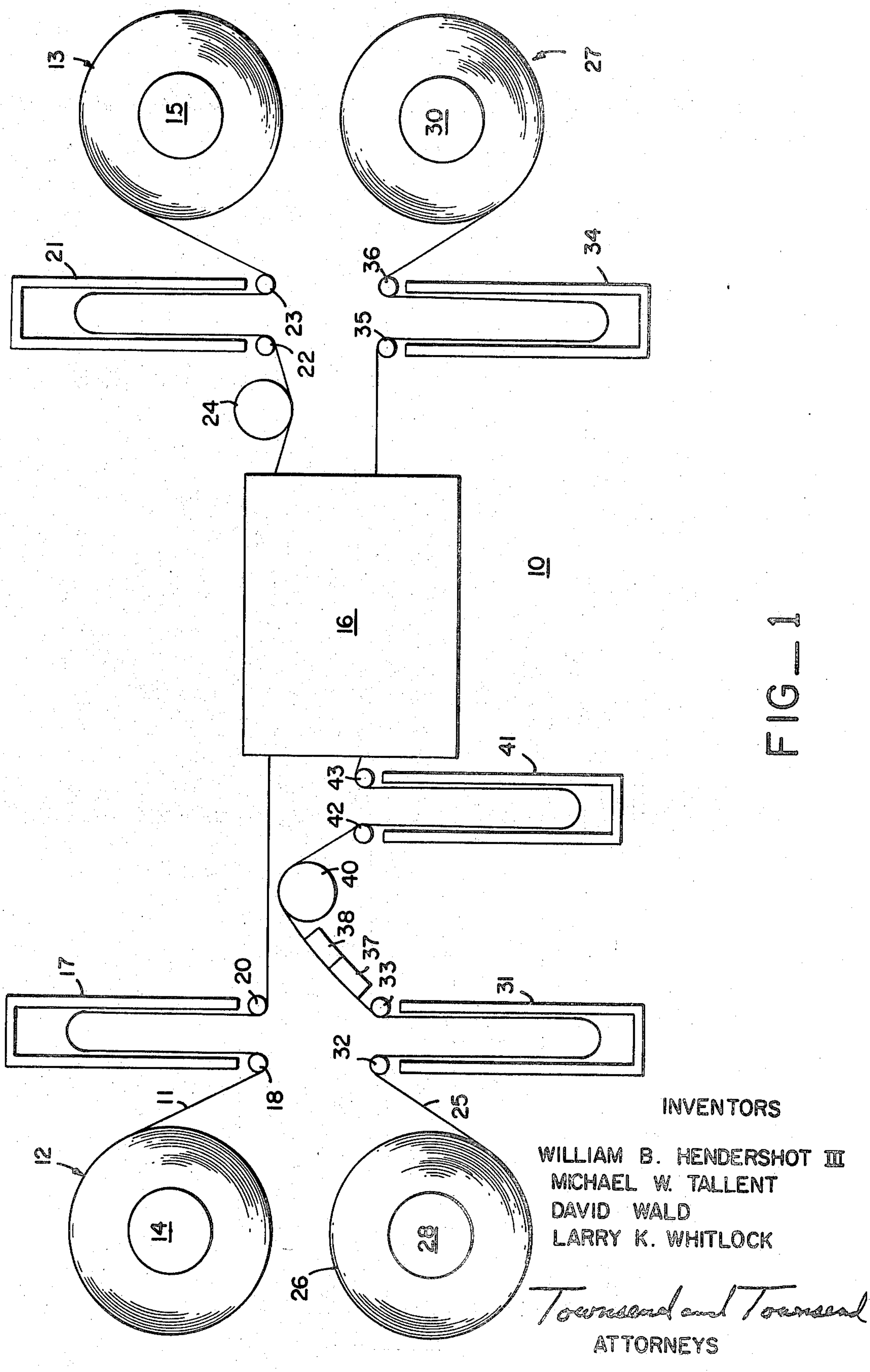
FIG. 1 is a diagrammatic plan view of a system for high speed thermal duplication of magnetic tape in accordance with the present invention.

Referring to the example illustrated in FIG. 1, the system for high speed thermal duplication of magnetic tape also referred to herein as the thermomagnetic recording system includes the master tape transport for driving a master tape 11 along a predetermined path between a supply station 12 and a take-up station 13. In this example the master tape is transported from a supply reel 14 to a take-up reel 15 through a tape transfer area 16 at which the signal on the master tape is duplicated or recorded onto a slave tape or copy tape as hereinafter described. From the supply station 12 the master tape passes through a vacuum column 17 by way of air guides 18 and 20. The vacuum column 17 applies a fixed vacuum to the tape surface and thereby a fixed tension on the tape and is coupled through a feed-back circuit to the master supply reel motor not shown in FIG. 1 as hereinafter more fully described. Each of the air guides 18 and 20 comprises a sintered metal spindle or similar porous material through which air under pressure is vented to guide the master tape 11 around the spindle on an air cushion.

The vacuum column 17 serves to mechanically isolate a master tape 11 in the vicinity of transfer area 16 from the supply station and its supply reel and motor, to maintain a constant tension environment for the tape during transfer. Vacuum column 21 may similarly be associated with the take-up station 13 and its reel and motor to isolate the master tape in the transfer area from the take-up station. Air guides 22 and 23 guide the master tape through the column 21 while capstan 24 provides the motive source for driving the master tape. Absent the capstan 24, the vacuum columns 17 and 21 coupled in associated with the reel motors maintain the tape in stationary condition under fixed tension. The capstan 24 therefore drives the tape from the supply to the take-up station at the same time driving the slave tape as hereinafter described.

The system of FIG. 1 also includes a slave tape with copy tape transport for guiding a slave tape 25 between a supply station 26 and a take-up station 27 which in this example utilizes supply reel 28 and take-up reel 30 and associated motors not shown.

Vacuum column 31 coupled through feed-back circuitry to the motor for slave tape supply reel 28 maintains constant tension on the tape and isolates the slave tape in the vicinity of the transfer area from the slave tape supply station 26. The slave tape is guided through the vacuum column 31 by air guides 32 and 33. Similarly vacuum column 34 isolates the tape in the transfer area 16 from slave tape take-up station 27 as heretofore described, the slave tape being guided through the vacuum column 34 by air guides 35 and 36.

In passing through the transfer area 16 the slave tape 25 undergoes a heating and subsequent cooling as hereinafter more fully appears. The heating and subsequent cooling of the slave tape during transfer has the effect of setting certain characteristics of the tape carrier or substrate, for example a polyester base, with consequent distortion of the transferred signal. The conventional solution to this problem has been to pre-run the tape through the system to set the characteristics of the tape base or substrate prior to recording thereby avoiding distortion of the transferred signal. According to the present invention and as exemplified in FIG. 1 the problem of setting of the slave tape or copy tape prior to transfer is solved by providing a tape pre-conditioner consisting of a heater 37 followed by a cooler 38 which set the characteristics of the base or tape carrier in the manner heretofore accomplished by a prerun of the tape through the system without the necessity of doing so.

Capstan 40 serves as an auxiliary capstan for the slave tape, and is coupled to the fifth vacuum column 41 to maintain the tape at a fixed depth in the column as hereinafter described. It does not determine tape speed.

As is apparent in FIG. 1, a fifth vacuum column 31 is interposed in the slave tape path upstream from the transfer area of 16 and the slave tape is guided through the vacuum column 41 via air guides 41 and 43. Unlike vacuum columns 17, 21, 31 and 34 to which a fixed vacuum is applied for isolating the tapes in the vicinity of the transfer area 16 from the supply and take-up stations and for maintaining constant tension, a variable vacuum is applied to vacuum column 41 under control of a feed-back control signal in order to eliminate distortion in the duplicated signal as hereinafter more fully described.

Figure 2:
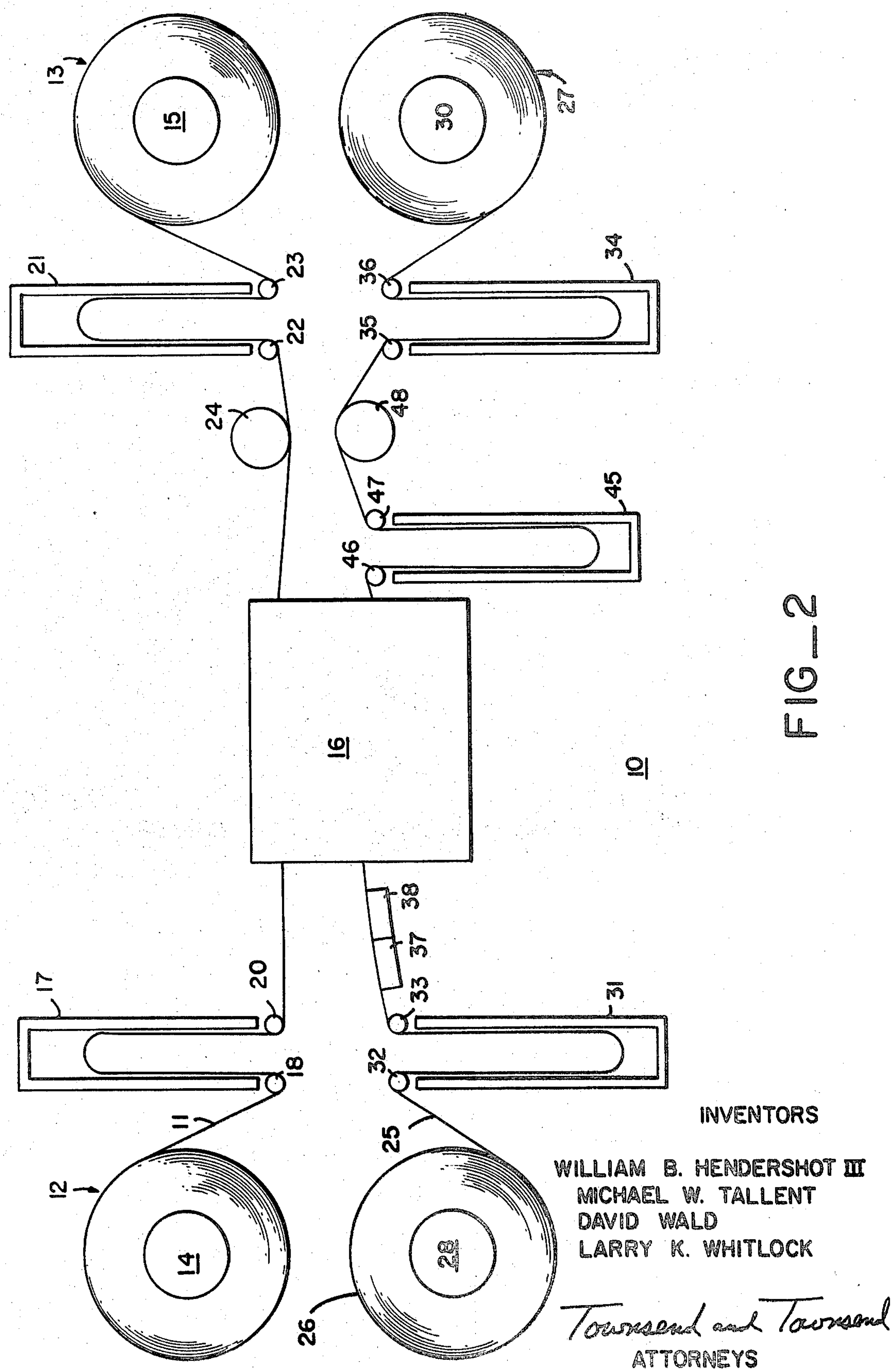
FIG. 2 is a diagrammatic plan view of another system for high speed thermal duplication of magnetic tape in which a fifth vacuum column is interposed in the slave tape path downstream from the transfer area rather than upstream from the transfer area as in FIG. 1.

Another example of a thermomagnetic recording and duplicating system similar to that shown in FIG. 1 is illustrated in FIG. 2 with one major difference. All of the corresponding components are designated by the same reference numbers as utilized in FIG. 1. In the system of FIG. 2 however, a fifth vacuum column 45 is interposed in the slave tape path downstream from the transfer area 16 rather than upstream in the manner shown in FIG. 1. The slave tape 25 passes through the vacuum column 45 by way of air guides 46 and 47 while non-driving capstan 48 serves as a frictionless guide for the slave tape. The vacuum applied to vacuum column 45 is variable in accordance with a feedback control signal for compensating for and eliminating distortion in the duplicated signal by varying tension on slave tape 25 downstream from the transfer area. In the example of FIG. 1 such control was achieved by varying the vacuum in vacuum column 41 and thereby the tension on the slave tape upstream from transfer area 16. The differences between control of the tension on the slave tape upstream from the transfer area 16 and downstream from the transfer area will appear more fully hereinafter.

In the systems of FIGS. 1 and 2 the elements of the tape transports are mounted on a flat base plate formed of metal such as aluminum. The upper surface of the aluminum plate is anodized to form a hard index surface against which the lower edge of the master tape 11 and slave tape 25 are indexed. The hard upper surface, such as the anodized aluminum surface is resistant to abrasion from the tape and thereby serves as an index edge as the tapes are guided from supply stations to the take-up stations.

Figure 3:
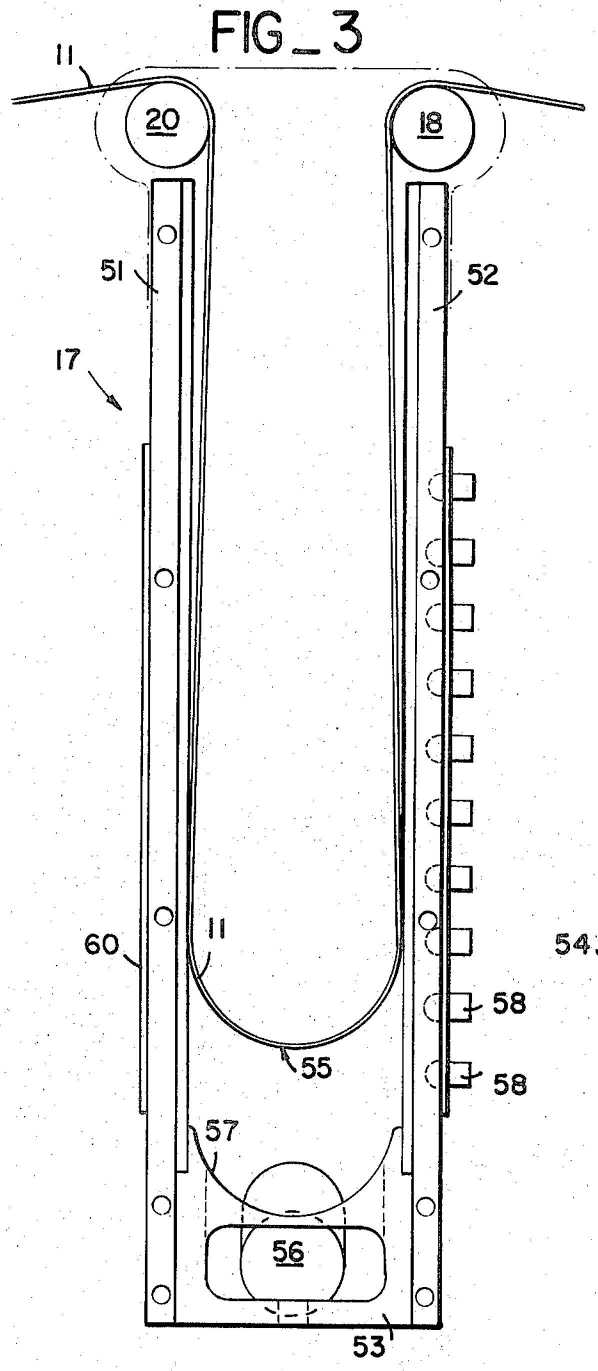
Figure 4:
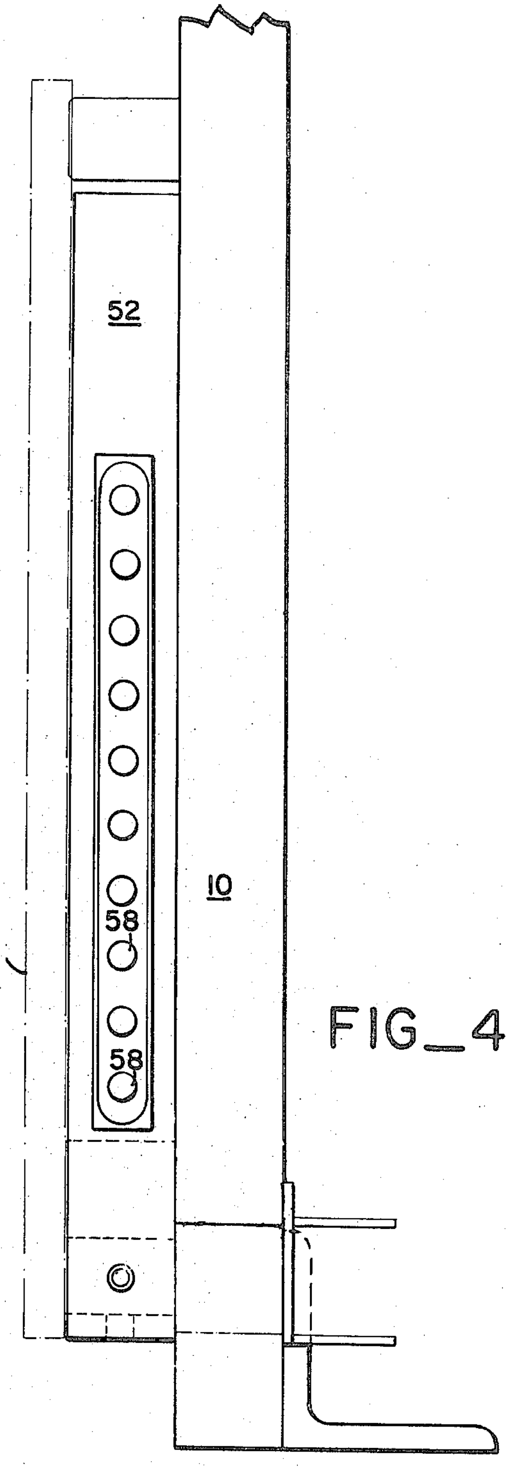
Figure 3A:
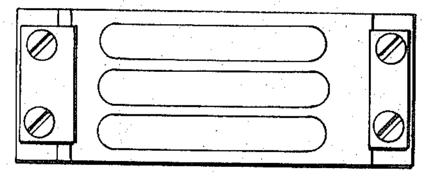
FIG. 3*a* is an end view looking into the vacuum column.

Referring to FIGS. 3 and 4, each of the vacuum columns, for example vacuum column 17 consists of side walls 51 and 52 closed at one end by end wall 53 and open at the other through which the tape 11 passes around air guides 18 and 20. The walls are sealed at the top by plate 54 shown in outline in FIG. 4 for maintaining the vacuum against the outer surface 55 of the tape 11 as it passes inside the vacuum column. The vacuum is applied through channel 56 and curved wall 57 through which holes are formed so that the low pressure communicates with the outer surface 55 of the tape 11. Along one side of the vacuum column, namely along wall 52 is provided a row of lamps 58 mounted in a row of holes formed through the wall 52 so that the light impinges on the opposite wall 51 absent interference by the tape 11. Thus as shown in FIG. 3 only light from lamps beyond the end of the loop toward the end of the row illuminate the opposite wall 51, all other light being blocked by the tape 11. Mounted along the opposite wall 51 of the vacuum column is a photosensitive strip 60 mounted along an opening formed through the wall 51 to receive light from the lamps 58. As more fully described with reference to FIG. 17 the photosensor is coupled through feed-back circuitry to the reel motor with which the vacuum column is associated and the feed-back control signal generated by the photosensor is used to regulate the reel motor so that the tape is maintained at a fixed depth within the vacuum column. The output from the strip 60 is proportional to the extent of illumination. In the case of the fifth column such as vacuum column 41 of FIG. 1 and vacuum column 45 of FIG. 2, the feed-back control signal generated by the photosensor along one side of the vacuum column is used to regulate the capstan motor of the capstan associated with the vacuum column. Thus, vacuum column 41 operates in association with the motor of capstan 40 while vacuum column 45 operates in association with the motor of capstan 48. As heretofore described, capstans 40 and 48 do not function as drive capstans but merely operate in association with the fifth vacuum column to maintain the tape at a fixed depth within the column and the capstan rotates to provide a frictionless guide for the tape.

In order to provide vacuum columns which are adjustable to variable tape widths for example adjustable to receive both 1 inch and ½ inch or ¾ inch tapes, a vacuum column of the type illustrated in FIGS. 14, 15 and 16 can be used. As shown in those Figures, a side wall 60 of the column is formed with holes 61 along the lower half or base of the wall 60 for receiving the lamps. Similarly the photosensitive element is positioned along the opposing wall of the vacuum column along the lower half or base for receiving light from the lamps.

Where the wall 60 has a height dimension adequate to receive 1 inch wide tapes the top placed across the walls of the column are the same as the top 54 illustrated in FIG. 4. In order to receive half inch tapes however the top illustrated in FIGS. 15 and 16 is used. As shown in these Figures, the top consists of a flat plate 63 similar to the cover 54 shown in FIG. 4 except that it is provided with a depending or projecting face 64 conforming in shape around its outer perimeter with the inside of the vacuum column. The inner face 64 projects a distance below the cover plate 63 a distance determined by the width of the tape intended to be accomodated within the vacuum column. Thus, for half inch tape the projecting face 64 fills substantially half the width of the vacuum column providing an index surface, for example, for a half-inch tape within the vacuum column. The top cover illustrated in FIGS. 15 and 16 includes the circular machine portions 65 and 66 to fit over the air guide spindles 18 and 20. By this expedient, the vacuum column can be quickly modified to accommodate tapes of different widths by merely changing the cover plate over the walls of the vacuum column.

The thermomagnetic recording or duplicating system illustrated in FIG. 5 is similar to that described with reference to FIG. 1 except that instead of vacuum columns for isolating the supply and take-up stations from the transfer area and for maintaining constant tension on the tapes, spring loaded tension arms 70, 71, 72 and 73 are provided in association with the supply station and take-up stations and spring biased tension arm 74 is provided in place of the fifth vacuum column for controlling tension on the tape to compensate for and eliminate distortion in the duplicated signal. All other elements of the system remain the same with the spring bias performing the function of the vacuum or low pressure.

Figure 6:
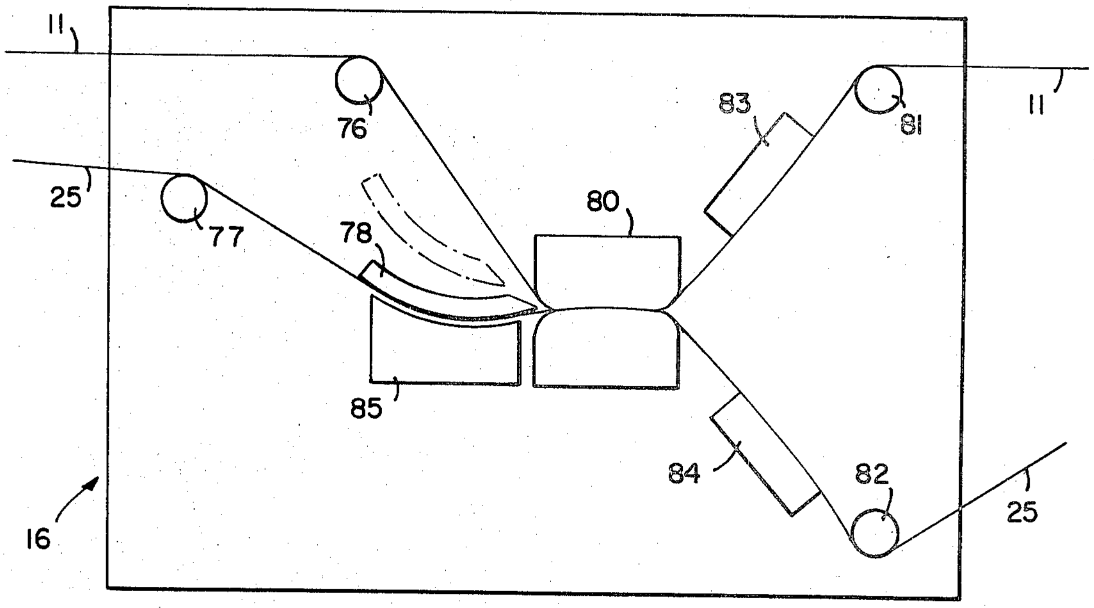
FIG. 6 is a detailed diagrammatic plan view of the transfer area showing the heater, air clamp, sensors, and air guides.

The elements of the transfer area 16 of the thermomagnetic recording and duplicating system are illustrating in further detail in FIG. 6. The master tape 11 and slave tape 25 enter the transfer area along tape transport paths defined by air guides 76 and 77 respectively. The path of the slave tape 25 is thereafter defined by the curved surface of contact heater 78 to which surface the tape conforms under tension in intimate contact as hereinafter more fully described. The heater 78 is shiftable to a position outside the slave tape transport path as shown in phantom.

The master tape 11 and slave tape 25 thereafter enter air pressure clamp 80 which maintains the master tape and slave tape under pressure and intimate contact with each other for a predetermined distance. Thus, the master tape and slave tape paths coincide for a predetermined distance through the air pressure clamp 80 after which the master tape and slave tape are separated traveling separate transport paths defined by air guides 81 and 82 respectively. On emerging from the air pressure clamp 80, the master tape 11 and slave tape 25 pass adjacent tape coolers 83 and 84 which cool the polyester or other plastic base of the magnetic tape.

It is apparent that in the operation of the system, using the transfer area exemplified in FIG. 6, the master tape 11 and slave 25 are oriented with the magnetizable surfaces facing each other with the base or substrate supports on the outside. Incidental heating of the substrate or base during the thermal duplication process can result in tape distortion under the tension of transport so that heating of the base or substrate should be minimized. The tape coolers 83 and 84 hasten and accelerate the cooling of the tape after emergence from the air pressure clamp 80 during which transfer or duplication of the master signal occurs. To futher prevent base side heating in the example of FIG. 6 a cooler 85 is provided in the slave tape path upstream from the air pressure clamp in juxtaposition to the heater 78 with which the slave tape is in intimate contact. The base side cooler 85 is provided to minimize thermal penetration from heating element 78 into the substrate of the tape. To the extent possible, it is desired to limit the thermal skin depth or thermal penetration to the material of the magnetizable layer which must be heated to the vicinity of its Curie temperature on the slave tape to effect the thermal duplication.

The heater 78 is shown in further detail in FIG. 6a and consists of a length of heat conducting metal providing an elongate surface 187 of heat conducting material which defines a length of the slave tape path. Imbedded in the length of heat conductive material is a row of electrical heating elements 188 which are electrically controlled in the manner set forth in FIG. 11.

As shown in FIG. 11 the heating elements of heater 78 are electrically powered by an AC power input through power control 90. A thermocouple in the heater actuates a temperature indicator 91 which provides a reading of the heater temperature to an operator. At the same time a thermistor temperature sensor coupled to the heater generates a signal temperature of geater 178 which is compared by comparator 92 with a signal representing a standard preselect temperature generated by temperature adjustment 93. The comparator provides a difference signal for feed-back control of the AC power input through power control 90 so that the temperature of heater 78 is precisely controlled for efficient thermal duplication of the master tape signal onto the slave tape.

Referring back to FIGS. *6a* and *6b* the upstream or leading end of the heater 78 is provided with a vacuum slot 195 along the heat conducting surface to which a low pressure or vacuum is communicated through channel or passageway 196. This important expedient achieves intimate contact between the slave tape and the heat conducting surface 187 as it passes at high speed through the tape transport. Because of the high speed of the tape an air cushion or air surface is generated along the surface of the tape which would otherwise space the tape from the heat conducting surface. The vacuum slot functions to eliminate the air cushion or air stream and thereby draw the tape against the heat conducting surface 187 for efficient heating of the magnetizable material layer.

In each of the thermomagnetic recording systems illustrated in FIGS. 1, 2 and 5 a tape preconditioner is illustrated consisting of a heater 37 followed by a cooler 38. The heater 37 is shown in further detail in FIG. 7a and consists of a length of heat conducting metal providing an elongate surface 87 of heat conducting material which defines a length of the slave tape path. imbedded in the lenth of heat conductive material is a row of electrical heating elements 88 which are electrically controlled in the manner set forth in FIG. 11 as heretofore described.

Referring back to FIGS. *7a* and *7b* the upstream or leading end of the heater 37 is provided with a vacuum slot 95 along the heat conducting surface to which a low pressure or vacuum is communicated through channel or passageway 96. A similar vacuum slot and passageway can be provided at the trailing edge of the heater also as shown in FIG. *7a.* As heretofore described this important expedient achieves intimate contact between the slave tape and the heat conducting surface 87 as it passes at high speed through the tape transport. The vacuum slots function to eliminate the air cushion or air stream and thereby draw the tape against the heat conducting surface 87 for efficient heating of the magnetizable material layer.

An example of a cooler 38 is illustrated in FIG. 7c which consists of a heat conducting surface 97 to which coolant is applied having an inlet 98 and outlet 100. The elongate cooler surface 97 defines the portion of the tape path and the base side tape coolers 83 and 84 of FIG. 6 can be of this type.

The heater 78 illustrated in FIG. *6a* and the heater 37 shown in FIG. *7a* are saturation heaters which in heating the magnetizable material also effect thermal penetration into the base or substrate of the magnetic tape increasing the possibility of distortion of the tape under tension as it passes through the tape transport. For this reason as mentioned above it is desirable to minimize the thermal skin depth or thermal penetration of the heat into the tape restricting it to the extent possible to the magnetizable material which must be heated to the vicinity of its Curie temperature. Two alternative forms of heaters for accomplishing these purposes are illustrated in FIGS. 9 and 10.

As shown in FIG. 9 the heater 111 consists of a short segment of heat conducting material such as metal in which an electrical heating element 112 is imbedded. A thermistor 113 and thermocouple 114 are also provided and the heater is generally operated in the same manner as that illustrated in FIG. 11. The length of the heat conducting surface 115 along which the tape passes however is considerably shorter than that afforded by heater 78 shown in FIG. 6A. The effect of heater 111 is to heat the layer of magnetizable material restricting the thermal skin depth or thermal penetration to only the upper layer of the tape thereby minimizing penetration of heat into the base film. The heater is positioned immediately upstream from the air pressure clamp 80 in the slave tape path which in the example of FIG. 9 is transposed to the other side of a tape transport assembly. Because of the short period of heating effected by the heater 111 it is referred to herein as a flash heater as distinct from the saturation heater 78. By way of example, a heater 4 inches in length formed of copper material with imbedded electrical heaters can be used. The copper can be coated with a thin chrome layer.

Another example of a heater is illustrated in FIG. 10 in which flash heating is accomplished by a flame burner 116 which may be for example an oxygen gas burner. As the master tape 11 and slave tape 25 converge into the air pressure clamp 117, the slave tape 25 is heated by the flame from the flash heater 116 for a period of short duration resulting in a thermal skin depth restricted to the upper layer of the tape. At the same time the base side or substrate of the magnetic tape is cooled along surface 118 which consists of a heat conducting surface against which a coolant is applied through a passageway having an inlet 120 and an outlet 121. The air pressure clamp 117 is a modification of the air clamp 80 hereinafter described and incorporates a cooler at the leading edge of the slave tape side of the air clamp.

The air clamp assembly is illustrated in further detail in FIG. 8. The air clamp 80 consists of a pair of juxtaposed air pressure chambers 125 and 126 having inlets 127 and 128 respectively through which high pressure air is delivered. The chambers 125 and 126 are defined on three sides by aluminum walls 130 and 131 respectively and by a base and a top not shown in the cross sectional views of FIG. 8. The fourth side of each pressure chamber is formed by a sintered stainless steel plate or similar porous material so that chambers 125 and 126 are enclosed on the sides adjacent each other by sintered stainless steel plates 132 and 133 or similar porous material respectively. By way of another example the sintered plates can be formed from beryllium copper. The air pressure supplied to the air pressure chambers within the bearing are, for example, in the order of 15–20 lbs. per square inch.

The plates 132 and 133 define a common portion of the master tape and slave tape paths of predetermined length through which the master tape 11 and slave tape 25 pass. In the path length defined by the pressure clamp and sintered plates 132 and 133, air under pressure forced through the porous plates forces the master tape and slave tape together against each other in intimate contact. The clamping force is such that only one of the tapes need be driven by a drive capstan shown in the system of FIGS. 2 and 5 with the drive capstan being in the master tape path. The clamping force at the air pressure clamp pulls the other tape, in this case the slave tape, along with it.

An alternative form of the present invention for providing AC assisted or anhysteretic thermal duplication of recorded magnetic tape is illustrated with reference to FIG. 13. FIG. 13 sets forth in modification in the transfer area of the systems described with reference to the preceding figures in order to permit AC assisted thermal tape duplication or from another point of view, thermally assisted AC duplication of magnetic tape. As used herein, the phase "AC assisted" tape duplication is defined to refer to "anhysteretic" tape duplication. Recently equipment has been developed which duplicates video tapes through an AC or anhysteretic contact duplication process. These devices use a high coercivity mirror image master tape in the order of approximately 900 oersteds and standard iron oxide tape in the order of 300 oersteds brought into contact in the presence of an AC magnetic field. This AC duplication process however is inefficient at long wavelength. The present invention therefore contemplates combining both AC or anhysteretic techniques and thermal duplication techniques to provide highly efficient magnetic tape signal duplication at temperatures lower than otherwise required in thermal duplication. In order to accomplish these results the present invention contemplates as illustrated with reference to the example in FIG. 13 incorporating a magnetic head 140 in the tape transfer area at the point of pressure clamping of the master tape 11 and slave tape 25 against each other in intimate contact. The air clamp 141 is therefore modified to accommodate the magnetic head 140 in the region of contact of the master tape and slave tape after the slave tape has been heated by heater 78. Thus, the magnetic head to which an AC signal is applied is positioned along the coincident portion of the master tape and slave tape paths immediately downstream from the heater 78.

By way of example, a standard rate of speed for the tape in the tape transport of the high speed thermal duplication process might be in the order of 120 inches per second. At this rate, an AC signal in the order of one megahertz is applied to the magnetic recording head 140. The gap in the magnetic recording head is set for example in the order of 1 mil. so that every point of magnetizable material on the slave tape experiences in the order of 100 domain switches or greater. The slave tape is heated to a temperature approaching the Curie temperature sufficient to achieve the ratio of coercivities of the master tape to the slave tape or approximately 2 : 1 or greater and preferably 3 : 1.

Precise control of the tension on the master and slave tape during the thermal recording or duplication process is implemented in two respects in accordance with the present invention. As heretofore described, the master and slave tapes in the vicinity of the transfer area are isolated from anomalous source variations from the take-up and supply reel stations by means of four vacuum columns or four spring loaded tension arms which operate in association with the corresponding supply or take-up station as illustrated with reference to FIG. 17. As shown in FIG. 17, the vacuum column 17 of the type illustrated in FIGS. 3 and 4 provides an output from the pohotovoltaic cell 60 for controlling the motor 150 which drives the supply reel or take-up reel 151 at the station with which the vacuum column 17 is associated. Thus, the photovoltaic cell light sensor 60 provides an output which varies in accordance with the depth of the tape 11 or 25 in the vacuum column. A servo control unit 152 responds to the feed-back signal to control the torque applied by motor 150 to the reel 151, at the supply station, for example. A fixed vacuum is applied to the vacuum column against the surface of tape 11 within the column via passageway 153 while the motor applies force on reel 151 directly opposing the pull from the vacuum column. The torque applied by motor 150 is thereby continually adjusted by servo control mechanism 152 to maintain the tape 11 at a fixed depth within the vacuum column. By this expedient, the force applied to the tape is maintained at a constant level proportional to the vacuum pressure applied to the tape which is itself fixed. The tension on the tape thereby remains constant, a function of the constant vacuum applied to the vacuum column, and anomalous forces from the supply station are thereby isolated. Each of the four vacuum columns associated with one of the four supply and take-up stations is coupled with the corresponding station in this manner thereby tensionally isolating the portions of the slave and master tape in the vicinity of the transfer area.

As heretofore mentioned, heating of the slave tape and consequent thermal penetration into the polyester or other plastic tape base may result in distortion of the tape under the tensions of tape transport. Thus, upon initial heating the slave tape may be stretched. After stretching the master signal is duplicated onto the stretched slave tape in the pressure clamp. After transfer the slave tape cools contracting and thereby distorting the duplicated signal relative to the master tape signal. The present invention contemplates precise control of the tension on either or both of the master tape and slave tape to control, compensate for, or eliminate such distortion. This is accomplished in the examples of FIGS. 1 and 2 by adding a fifth vacuum column in the slave tape path either upstream from the transfer area as shown in FIG. 1 or downstream from the transfer area as shown in FIG. 2. In the system of FIG. 5 this is accomplished by adding a fifth spring tension arm. Whereas the vacuum is maintained constant in the four vacuum columns associated with the stations, the fifth vacuum column is provided with a variable vacuum which varies in response to a feed-back control system as hereinafter described.

Before turning to this point however, it should be mentioned that a capstan is provided in association with the fifth column, capstan 40 in FIG. 1, and capstan 48 in FIG. 2. As heretofore mentioned this is not a drive capstan for driving the slave tape through the tape transport. Tape driving is accomplished by the single drive capstan in the master tape path which by means of the pressure clamp also drives the slave tape. The purpose of capstan 40 as in FIG. 1 and 48 as in FIG. 2 and their associated motors is for controlling the depth of the tape in the associated vacuum column. Thus, the output from the photovoltaic cell from the fifth vacuum column is coupled to the motor of the capstan in the manner described with reference to FIG. 17. In every other respect the capstan merely functions as a frictionless bearing or guide for the tape as it is transported.

As shown in FIG. 12 a magnetic head or sensor is provided along the path of the master tape on one side and a slave tape on the other, after passage through the transfer area and after the duplication process has been completed. Each of the sensors picks up the magnetic signal in the master tape and slave tape respectively. The master tape signal is fed to amplifier 156 while the duplicated signal on the slave tape is fed to amplifier 157. The two signals from amplifiers 156 and 157 are fed to comparator 158 which followed by the error amplifier 160 generates a difference signal for feed-back control of the vacuum applied by the fifth column on the slave tape. Control the vacuum of the fifth column is accomplished by a vacuum control 161 in response to the difference feed-back control signal. By way of example the feed-back control signal would generally by generated to vary in accordance with the difference in frequencies and or phase between the signals on the master tape and slave tape. Thus the frequency of the master tape signal is compared with the frequency of the duplicated signal on the slave tape to determine whether distortion has occured by way of contraction or expansion of the slave tape. In the event of contraction of the slave tape after duplication distortion will occur in the direction of increased frequency. In order to compensate for such distortion the feed-back control system and tension control can be used in several ways. In FIG. 1 the vacuum column is positioned upstream from the transfer area in this case the signal is applied to reduce the drag on the tape as it enters the tape transfer area so that the tension on the tape upon heating and clamping is reduced thereby minimizing stretching prior to and during duplication. Ideally the input vacuum column can be adjusted to reduce the drag or tension on the tape so that it approaches zero as it enters the transfer area.

In the example of FIG. 2 the vacuum column is applied downstream for the transfer area and it can be used to increase the pressure or force on the tape so that it sets without distortion relative to the signal on the master tape. In each of these examples a fifth vacuum column was supplied in the slave tape path. An alternative approach accomplishes the same result without the fifth vacuum column. In this embodiment the feed-back control system of FIG. 12 is applied to one of the two vacuum columns already existing in the slave tape path for isolating the slave tape from the supply station and take-up station. In every other respect the system is the same except that one of the columns is provided with variable vacuum which varies in accordance with the feed-back control signal as heretofore described with reference to FIG. 12.

Yet another alternative embodiment for controlling and eliminating distortion in the duplicated signal as a result of heating is to apply a variable force or tension on the master tape upstream from the tape transfer area according to this embodiment, a fifth column can be provided in the master tape path upstream from the transfer area or the variable vacuum can be applied to the vacuum column 17 which isolates the supply reel station. In this arrangement the feed-back control signal is utilized to increase the tension or force on the master tape upstream from the tape transfer area in order to stretch the tape an amount to compensate for stretching of the slave tape due to heating. The master tape signal is therby distorted to lower frequency which is then duplicated on the stretched slave tape which upon cooling and contraction restored the signal towards original undistorted form. Upon passage of the master tape through the higher tension upstream from the tape transfer area the master tape also returns to its normal state.

it is apparent that the locations for tension control described in the foregoing three examples exhaust the possibility. Thus, tension control to compensate for the eliminate distortion utilizing the feed-back control signal generated by the circuitry of FIG. 12 can be applied in the slave tape path either upstream or downstream from the transfer area and in the master tape only upstream from the transfer area. In each of the foregoing examples, instead of adding a fifth vacuum column for tension control, one of the other existing vacuum columns can be utilized, as heretofore described.

As heretofore described the air guides on the index base plate which guide the tapes through the master tape and slave tape transport paths are spindles of sintered material through which high pressure air is forced as illustrated in FIGS. 18a and 18b. The high pressure air entering the air guide or spindle 160 through air passageway 161 is forced through porous openings in the sintered wall 162 to provide an air cushion for tape passing around the guide. In order to maintain the tape against the index edge 10 formed by the surface of the base plate, a wall or channel 163 is formed around the base of the spindle to prevent air forced through the wall of the air guide from forcing the tape upward and away from the index edge. The well 163 therefore serves the function of permitting the spindle to function as an air guide while still permitting the tape to rest securely against the index edge 10.

What is claimed is:

1. A system for high speed thermal duplication of magnetic tape comprising:

first tape transport means for transporting a master tape carrying a signal to be recorded comprising a supply reel station, a take-up reel station, means for applying predetermined tension to a master tape transported between the stations, and means for guiding the master tape between the stations in a predetermined path;

second tape transport means for transporting a slave tape on which a signal is to be recorded comprising a supply reel station, a take-up reel station, means for applying predetermined tension to a slave tape transported between the stations, and means for guiding the slave tape between the stations in a predetermined path, said first and second tape transport means positioned in adjacent relationship with a portion of the respective master and slave tape paths coinciding;

clamping means interposed in the paths of said first and second tape transport means for pressure clamping a master tape and slave tape in intimate contact against each other along the predetermined coinciding length of said paths;

heater means along the path of the second tape transport means upstream from the clamping means for heating a slave tape transported by the second tape transport means;

means for sensing the corresponding signals on the master and slave tape downstream from the heater means and clamping means and for generating a feed-back control signal proportional to the frequency difference between said signals;

and means for controlling the tension on one of said tapes in accordance with said difference feed-back control signal.

2. A system for thermal duplication of magnetic tape as set forth in claim 1 wherein the elements of said first and second tape transport means are mounted on a flat plate which forms an index edge for the lower edges of a master tape and slave tape mounted on the first and second tape transport means.

3. A system for thermal duplication of magnetic tape as set forth in claim 2 wherein said flat plate comprises an anodized metal plate.

4. A system for high speed thermal duplication of magnetic tape as set forth in claim 1 wherein is provided a plurality of vacuum columns interposed in the tape transport paths of the first and second tape transport means to provide precise tension control along the predetermined tape paths and to mechanically isolate portions of the tape transport paths.

5. A system for thermal duplication of magnetic tape as set forth in claim 4 wherein four vacuum columns are provided, one downstream from each of the supply reel stations and one upstream from each of the take-up reel stations of the first and second tape transport means.

6. A system for thermal duplication of magnetic tape as set forth in claim 5 wherein is provided a fifth vacuum column interposed in the tape transport path of the second tape transport means intermediate the supply reel station vacuum column and the take-up reel station vacuum column and wherein said feed-back control signal is coupled for controlling the vacuum applied to said fifth vacuum column tape by controlling tension on said tape.

7. A system for thermal duplication of magnetic tape as set forth in claim 4 wherein is provided feed-back control means for controlling the vacuum applied to one of the vacuum columns in the tape transport path of the second tape transport means in accordance with the feed-back control signal to compensate for dynamic tensional errors and eliminate differences between the signals on a slave tape and master tape transported by the tape transport means.

A system for thermal duplication of magnetic tape as set forth in claim 1 wherein is provided in the path of the second tape transport means upstream from the heater means and clamping means, a tape preconditioner comprising a heater followed by a cooler for preconditioning a slave tape carried by the second tape transport means.

9. A system for thermal duplication of magnetic tape as set forth in claim 1 wherein said clamping means comprising means for clamping a master tape and slave tape together over a predetermined length of the tape transport paths by means of air pressure.

10. A system of thermal duplication of magnetic tape as set forth in claim 9 wherein said air pressure clamping means comprises a pair of opposed spaced apart sintered plates between which pass the master tape and slave tape carried by the first and second tape transport means, and means for applying high pressure air from the outside of each of said plates.

11. A system for thermal duplication of magnetic tape as set forth in claim 1 wherein said heater means comprises an elongate surface of heat conducting material interposed along the path of a slave tape carried by the second tape transport means, means for heating the heat conducting surface, and a vacuum slot formed in the upstream end of said surface for applying low pressure to provide intimate contact between a slave tape carried by the second tape transport means and the heating surface.

12. A system for thermal duplication of magnetic tape as set forth in claim 1 wherein said heater means is provided with thermal sensing means for measuring the temperature of the heater means and for generating a feedback control signal, and feedback control means for controlling the temperature of said heater means.

13. A system for thermal duplication of magnetic tape as set forth in claim 1 wherein said heating means upstream from the clamping means is positioned on one side of the tape transport path of the second tape transport means for heating one side of a slave tape carried by the second tape transport means and wherein is also provided a cooling means opposed to said heating means on the opposite side of a slave tape for cooling one side of a slave while heating the other side.

14. A system for high speed thermal duplication of magnetic tape as set forth in claim 1 wherein is provided means for equalizing the tension on a master tape and slave tape carried by the first and second tape transport means comprising means for sensing the tension on a master tape carried by the first tape transport mechanism downstream from the clamping means and for generating a first feedback control signal, means for measuring the tension on a slave tape carried by the second tape transport means downstream from the clamping means for generating a second feedback control signal, means for generating a difference signal from said first and second feedback control signals, and means for controlling the tension on one of the tapes in accordance with said difference signal thereby to eliminate dynamic tensional errors and equalize the tension on the master tape and slave tape.

15. A system for high speed thermal duplication of a master magnetic tape onto a slave magnetic tape comprising:

a master tape handler comprising a supply reel station, a take-up reel station, and means for guiding a master tape between the stations in a predetermined path;

slave tape handling means comprising a supply reel station, a take-up reel station, means for applying predetermined tension to a slave tape transported between the stations, and means for guiding the slave tape between the stations in a predetermined path, said slave tape path and said master tape path being coincident over a predetermined length;

means for moving the tapes between the stations;

a transfer station interposed in the paths of the slave tape handler and master tape handler comprising means for clamping together under tension a master tape and slave tape transported by said master tape handling means and slave tape handling along the predetermined distance of path coincidence and a tape heater upstream from the clamping means in the slave tape path for heating the slave tape to a predetermined temperature prior to pressure clamping against the master tape;

means for generating a signal indicating a relative elongation or contraction of one of the tapes; and means responsive to the signal for compensating for the relative elongation or contraction of said one tape to thereby equalize the relative tape lengths.

16. A system for thermal duplication of magnetic tape as set forth in claim 15 wherein said means for tensionally isolating the segments of master tape and slave tape in the area of the transfer station comprise a plurality of mechanical tensional arms interposed in the master tape and slave tape paths at least one tension arm downstream from each supply reel station at least one tension arm upstream from each take-up reel station.

17. A system for high speed thermal duplication of a master magnetic tape onto a slave magnetic tape comprising a master tape handler for guiding the master tape between a supply station and a take-up station; a slave tape handler for guiding the slave tape between a supply station and a take-up station; means for guiding the tapes over a predetermined length through a coincident path; a transfer station at said path including means for heating the slave tape and means downstream of the heating means for pressuring the tapes into intimate contact; means for moving the tapes between their respective supply and take-up stations; means for sensing relative changes in the tape lengths downstream of the pressuring means due to elongations or contractions of one of the tapes, and means for equalizing such relative changes in the tape lengths to prevent relative distortion in recordings on the slave tape.

18. A system according to claim 17 including means downstream of the pressuring means for cooling at least one of the tapes.

19. A system according to claim 17 including means for tensionally isolating a portion of the master tape and a portion of the slave tape in the area of the transfer station during movement of the master tape and the slave tape between their respective supply and take-up stations comprising a plurality of vacuum columns through which the tapes are guided, at least one vacuum column disposed downstream from each supply station and at least one vacuum column disposed upstream from each take-up station, each vacuum column being defined by sides and cover having a surface substantially contacting an edge of the tape in the column, and further including means for adjusting the relative position of the surface to thereby accommodate in the vacuum columns tapes of differing widths.

20. A system according to claim 19 wherein the surface is defined by a protrusion of the cover depending into a chamber of the vacuum column, and including a plurality of covers having protrusions of differing lengths to accommodate the taps of differing widths.

21. A system for thermal duplication of magnetic tapes as set forth in claim 17 wherein the sensing means comprises means for sensing a master tape signal on the master tape downstream from the transfer station and for generating a first signal, means for sensing a slave tape signal on the slave tape downstream from the transfer station and for generating a second signal, and means for generating the difference signal from said first and second signals to provide a feedback control signal, and wherein the equalizing means comprises means for controlling in accordance with said feedback difference signal the tension on the slave tape to eliminate dynamic tensional errors between the slave tape and master tape.

22. A system for thermal duplication of magnetic tape as set forth in claim 21 including means for tensionally isolating segments of the master tape and slave tape in the transfer station area during transport of the master tape and slave tape comprising first vacuum columns downstream from each supply station and second vacuum columns upstream from each take-up station and wherein is also provided a third vacuum column in the slave tape path of the slave tape handling means intermediate the first and second vacuum columns, said third vacuum column having a variable vacuum controlled by said difference signal and feed-back control means.

23. Apparatus for the thermal duplication of magnetic tape comprising: means for guiding a master magnetic tape from a master supply station to a master take-up station along a master tape path; means for guiding a slave magnetic tape from a slave supply station to a slave take-up station along a slave tape path, means disposed between the respective stations for pressuring the tapes into intimate contact over a predetermined length of the paths, a heater for heating the slave tape path to a predetermined temperature to effect magnetic recordation thereon while the slave tape is in initmate contact with the master tape; and means downstream of the pressuring means positioned to intercept at least one of the tape moving between its supply station and its take-up station for cooling the tape.

24. Apparatus according to claim 23 wherein the cooling means includes means for cooling both tapes.

25. A system for thermal duplication of magnetic tape as set forth in claim 17 wherein the slave tape heating means comprises an elongate surface of heat conducting material positioned to contact the slave tape between the slave tape supply and take-up stations, a plurality of electrical heaters embedded in said surface, means for sensing the temperature of said surface and for generating a feedback control signal, and means for controlling the power supply to said electrical heaters in accordance with the feedback control signal.

26. A system for thermal duplication of magnetic tape as set forth in claim 25 wherein the surface of the material is provided with a vacuum slot at its upstream end and wherein there is provided means for applying low pressure to the vacuum slot to provide intimate contact between a slave tape and the heat conducting surface.

27. A system for thermal duplication of magnetic tape as set forth in claim 17 wherein there is provided upstream from the transfer station a slave tape preconditioner positioned to intercept the slave tape and comprising a heater followed by a cooler.

28. A system for thermal duplication of magnetic tape as set forth in claim 17 wherein said tape heating means comprises means for heating one surface of the slave tape and wherein it is also provided means for cooling the opposite surface of said tape.

29. A system for thermal duplication of magnetic tape as set forth in claim 17 wherein it is provided means for cooling the master tape and means for cooling the slave tape downstream from said transfer station.

30. A system for thermal duplication of a master magnetic tape signal onto a slave magnetic tape comprising:

means for transporting the master tape along a predetermined path from a supply station to take-up station;

means for transporting the slave tape along a predetermined path from a supply station to a take-up station;

means for pressure clamping the master tape and slave tape against each other along a predetermined length of the respective paths;

means for heating the slave tape to a predetermined temperature upstream from the pressure clamping means;

means for sensing the comparing the master tape signal and duplicate slave tape signal to detect distortion in the duplicate slave tape signal and for generating a feedback control signal is accordance with detected distortion;

and means for controlling the tension on one of said master tape or slave tape in response to said feedback control signal.

31. A system for thermal duplication of magnetic tape as set forth in claim 30 wherein the means for controlling tension comprises means for controlling tension on the slave tape upstream from the heating means and pressure clamping means.

32. A system for thermal duplication of magnetic tape as set forth in claim 30 wherein the means for controlling tension comprises means for controlling tension on the slave tape downstream from the pressure clamping means.

33. A system for thermal duplication of magnetic tape as set forth in claim 30 wherein the means for controlling tension comprises means for controlling tension on the master tape upstream from the pressure clamping means.

34. A system for AC assisted thermal duplication of a master magnetic tape onto a slave magnetic tape comprising:

master tape handling means for transporting the master tape comprising a supply station, a take-up station, means for applying predetermined tension to a master tape transported between the stations, and means for guiding a master tape between the stations in a predetermined path;

slave tape handling means for transporting a slave tape comprising a supply station, a take-up station, means for applying predetermined tension to a slave tape transported between the stations, and means for guiding a slave tape between the stations in a predetermined path, said slave tape path and master tape paths being coincident over a predetermined length;

and a transfer station interposed in the paths of the master tape and slave tape handling means comprising means for pressure clamping a master tape and slave tape transported by said master tape and slave tape handling means over the predetermined coincident length of the master tape and slave tape paths, a magnetic head along the upstream end of the coincident length of said paths and means for applying an AC signal to the magnetic head in order to apply an AC field to the clamped slave tape and master tape at the upstream end of the pressure clamping means, and heater means positioned in the path of a slave tape upstream from said clamping means and magnetic head for heating a slave tape transported through said transfer station thereby to increase the ratio of the coercivity of the master tape to the slave tape.

35. A system for AC assisted thermal duplication of magnetic tape as set forth in claim 34 wherein said heater means is adapted to heat the slave tape to a predetermined temperature to afford a coercivity ratio of the master tape to the slave tape of approximately 2 to 1 or greater.

36. A system for AC assisted thermal duplication of a master magnetic tape onto a slave magnetic tape of the type using means for transporting the master tape and slave tape over predetermined paths between supply stations and take-up stations, the master tape and slave tape paths being coincident over a predetermined length, means for pressure clamping the master tape and slave tape against each other along the predetermined coincident length, and means for heating the slave tape upstream from the pressure clamping means, the improvement comprising:

a magnetic head along the upstream end of the coincident path length of the master tape and slave tape and means for supplying an AC signal to the magnetic head in order to apply an AC magnetic field to the pressure clamped slave tape and master tape at the upstream end of the pressure clamping means.

37. A system for AC assisted thermal duplication of a master magnetic tape onto a slave magnetic tape comprising:

means for transporting the master tape along a predetermined path from a supply station to a take-up station;

means for pressure clamping the master tape and slave tape against each other along a predetermined length of the respective paths;

means for heating the slave tape upstream of the pressure clamping means to a temperature less than the Curie temperature of the magnetic material comprising the slave tape; and means for supplying an AC magnetic field to the pressure clamped slave tape and master tape.

38. A methof for thermal duplication of magnetic tape comprising:

transporting a master tape carrying a signal to be reproduced along a predetermined path from a supply station to a take-up station;

transporting a slave tape on which the signal is to be duplicated along a second predetermined path from a supply station to a take-up station;

heating the slave tape to a temperature in the vicinity of the Curie temperature of the magnetic material comprising the tape;

pressure clamping the slave tape and master tape against each other after heating the slave tape and maintaining said pressure contact over a predetermined path length so that the master and slave tapes are in pressure contact while the slave tape cools to a temperature below said Curie point;

sensing the signals on the master tape and slave tape after pressure clamping;

comparing said signals;

generating a feedback control signal in accordance with detected distortion in the slave tape signal;

and controlling the tension on one of said member tape or slave tape in response to said feedback control signal.

39. A method for thermal duplication of magnetic tape as set forth in claim 38 wherein the step of controlling tension comprises controlling tension on the slave tape prior to heat and pressure clamping.

40. A method for thermal duplication of magnetic tape as set forth in claim 38 wherein the step of controlling tension comprising controlling tension on the slave tape after heating the pressure clamping.

41. A method for thermal duplication of magnetic tape as set foth in claim 38 wherein the step of controlling tension comprises controlling tension on the master tape before pressure clamping.

42. A method for thermal duplication of magnetic tape as set forth in claim 38 wherein said step of pressure clamping the master and slave tapes against each other comprises applying air pressure against the master and slave tapes over a predetermined distance whereby the master and slave are maintained in pressure contact over said distance.

43. A method for thermal magnetic duplication of magnetic tape as set forth in claim 38 wherein it is also provided the step of applying an AC magnetic field to the pressure clamping slave tape and master tape.

44. A method for thermal duplication of magnetic tape as set forth in claim 38 wherein the step of heating comprises the step of heating the side of the slave tape facing the master tape and wherein is provided the additional step of cooling at the same time the side of the slave tape away from the master tape.

45. A method of thermal duplication of magnetic tape as set forth in claim 38 wherein the step of heating comprises heating the slave tape by contacting said tape against a thermally conducting heated surface.

46. A method of thermal duplication of magnetic tape as set forth in claim 38 wherein the heating step comprises flash heating the magnetizable layer of the magnetic tape thereby restricting heat dissipation in the tape substrate.

47. A method for thermal duplication of a master magnetic tape onto a slave magnetic tape comprising:

transporting a master tape carrying a signal to be reproduced along a predetermined path;

transporting a slave tape on which the signal is to be duplicated along a second predetermined path;

heating the slave tape to a temperature in the vicinity of the Curie temperature of the magnetic material comprising the tape;

applying air pressure to side lengths of the slave tape and master tape in a direction to force the master tape and slave tape against each other after heating the slave tape, and maintaining said pressure contact over a predetermined distance so that the master tape and slave tape are in pressure contact while the slave tape cools to a temperature below said Curie point;

and tensionally isolating the master tape and slave tape during heating and during application of air pressure to side lengths of the master tape and slave tape.

48. A method for thermal duplication of magnetic tape comprising:

transporting a master magnetic tape carrying a signal to be reproduced along a predetermined path;

transporting a slave magnetic tape on which the signal is to be duplicated along a second predetermined path;

heating the slave tape to below the Curie temperature for the magnetic material comprising the slave tape;

pressure contacting the slave tape and master tape against each other after heating the slave tape and maintaining said pressure contact over a predetermined path length; and applying an AC magnetic field to the pressure contacted slave and master tapes.

49. A method for thermal duplication of magnetic tape comprising:

transporting a master magnetic tape carrying a signal to be reproduced, along a predetermined path from a supply station to a take-up station;

transporting a slave magnetic tape on which the signal is to be duplicated along a second predetermined path from a supply station to a take-up station;

heating the slave tape to sufficient temperature so that the coercivity ratio of the master tape to the slave tape is approximately 2 : 1 or greater;

pressure contacting the slave tape and master tape against each other after heating the slave tape and maintaining said pressure contact over a predetermined path length; and applying an AC magnetic field to the pressure contacted slave and master tapes.

* * * * *